Dec. 5, 1967  R. L. HUNDSTAD  3,356,871
CONTINUOUS REHEAT MAGNETOHYDRODYNAMIC
GENERATING DUCT ARRANGEMENT
Filed Nov. 27, 1963
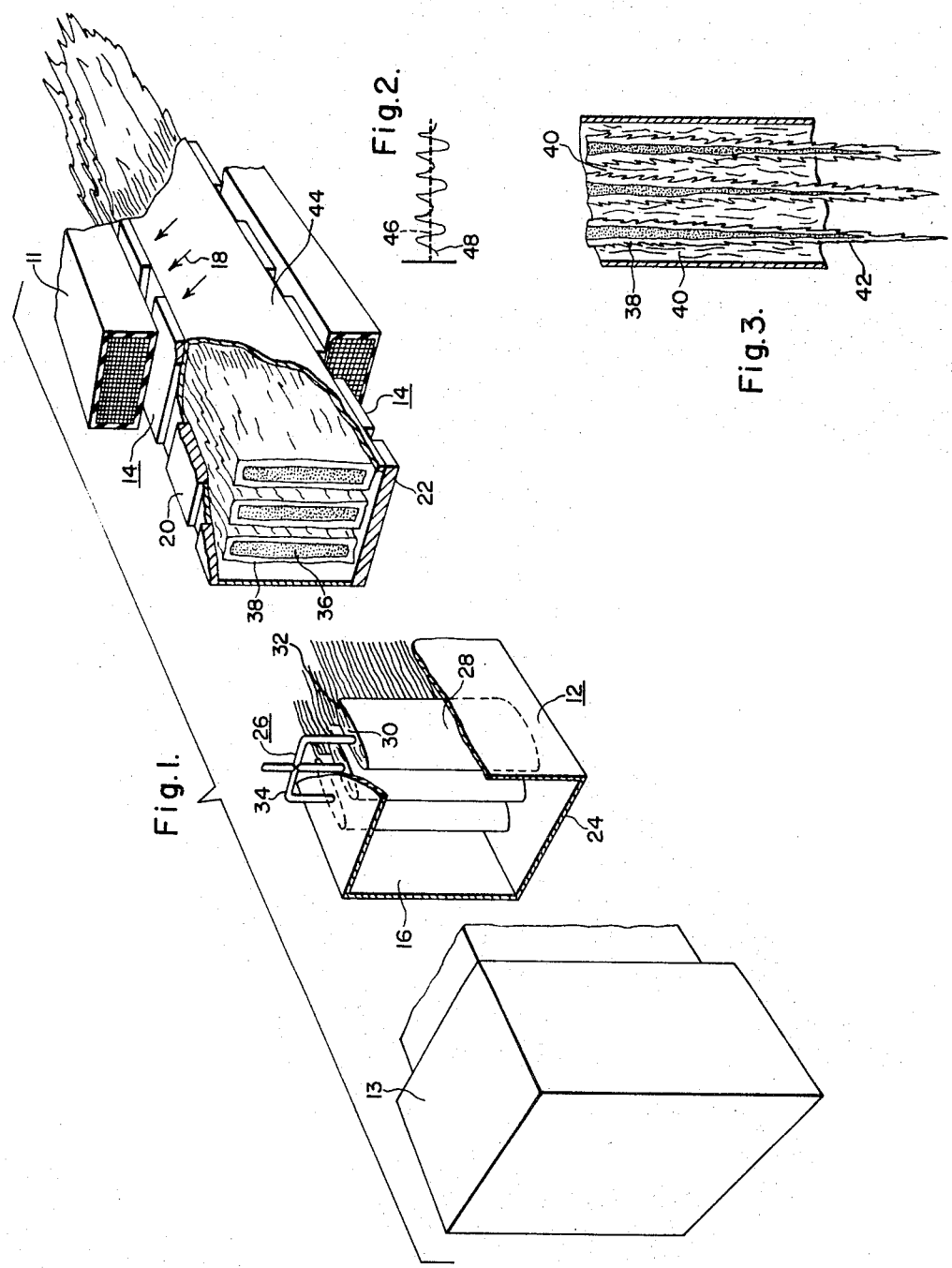
WITNESSES
Theodore F. Wrobel
Edward F. Possessky
INVENTOR
Richard L. Hunstad
BY F. V. Lyle
ATTORNEY

United States Patent Office 3,356,871
Patented Dec. 5, 1967

3,356,871
CONTINUOUS REHEAT MAGNETOHY-
DRODYNAMIC GENERATING DUCT
ARRANGEMENT
Richard L. Hundstad, Forest Hills, Pa., assignor to West-
inghouse Electric Corporation, Pittsburgh, Pa., a cor-
poration of Pennsylvania
Filed Nov. 27, 1963, Ser. No. 326,611
11 Claims. (Cl. 310—11)

The present invention relates to magnetohydrodynamic generating systems, and more particularly to continuous reheat generating duct arrangements therefor.

According to magnetohydrodynamic (hereinafter referred to as MHD) theory, an electric voltage is generated between electrodes on spaced walls of a duct along which a conductive fluid or ionized gas is transported and in which a magnetic field is established transversely of both the interelectrode direction and the flow direction of the fluid. This theory is a special case of the more general electromagnetic induction theory of Faraday according to which an electromotive force or voltage is induced in an electric circuit whenever the magnetic flux linking the circuit changes. As is well known in electromechanical machines, the Faraday theory accounts for voltage generation in copper or other solid conductors with which flux linkages continually undergo change by movement of the conductors through a magnetic flux field or by movement of a magnetic flux field across the conductors.

In an MHD system, a flowing conductive fluid or ionized gas is given the role of a conductor or conducting medium undergoing motion through a magnetic flux field, and an electric field and a corresponding voltage are produced across the moving fluid in a direction determined by well known directional rules of electromagnetic induction. Such induced voltage appears across the aforementioned electrodes between which the fluid is channeled, and when a load circuit is connected across the electrodes current is generated and circulated through the completed circuit.

Further considerations provide an elaboration of MHD theory so that the generated voltage and other operational characteristics obtained from a given generating system can be predicted with a reasonable degree of certainty. For example, if ionized gas is used as the conductive working fluid, generated voltage and current are dependent upon physical parameters (including electric conductivity, temperature, pressure and velocity) of the gas (which can comprise combustion products as well as seed atoms or molecules of a low ionization potential element such as cesium or potassium) and the manner in which such parameters dynamically undergo change particularly as the gas flows through the generating duct arrangement. The magnetic flux field and the physical properties of structural material such as magnetic permeability, electrical resistivity or conductivity and temperature-strength characteristics are also significant factors in voltage and current determination. More comprehensively, the operational nature of an MHD generating system is susceptible to mathematical analysis, and such analysis in terms of flow, electromagnetic and thermodynamic principles is available in recent research and patent literature, with reference particularly being given by way of example to copending application Ser. No. 202,714 entitled "Magnetohydrodynamic Generator Apparatus," filed by Stewart Way on June 15, 1962, now Patent No. 3,214,615, issued Oct. 26, 1965, and assigned to the present assignee.

Where combustion is employed to obtain the conductive working fluid or ionized gas, it is beneficial from an efficiency standpoint, as described in copending application Ser. No. 209,586 entitled "Magnetohydrodynamic Generator," filed by Richard L. Hundstad on July 13, 1962, now Patent No. 3,211,932, issued Oct. 12, 1965, and assigned to the present assignee, to provide reheat of the fluid in continuous or step form as the fluid flows along the generating duct. This is because the electrical conductivity of the fluid generally increases exponentially with increasing fluid temperature, and reheat thus counters both temperature drop and conductivity drop along the duct length to produce improved power generating density in the duct. Further, if reheat is provided by continued combustion in the duct itself, gains are obtained in electrical conductivity and power density (power generated per unit volume) beyond those attributable to increased temperature alone, since in the combustion zone or zones a non-equilibrium ionization condition arises in which numerous electrons are set free as current carriers.

To establish combustion throughout the duct length, it is preferable that the fuel (such as pulverized coal in a suitable vehicular medium, natural gas, acetylene or other hydrocarbon) and the oxidant components of the duct fluid be mixed non-homogeneously. In this manner, combustion zones are created between adjacent regions of fuel and oxidant, and such zones can extend along the full duct length or to a downstream point where the fuel or oxidant is exhausted.

A non-homogeneous fluid mixture can be obtained by injecting fuel or oxidant into the duct fluid at the duct inlet end or at spaced points along the duct length. Because of the resultant fluid temperature geometry in the duct fluid volume, the average operating temperature of the non-homogeneous fluid can be higher than the allowable limit for a homogeneous fluid mixture as prescribed by operational duct material temperature limitations. As would perhaps be expected, the non-homogeneous fluid pattern which results from the injected additive is a material determinant of generator performance.

In accordance with the broad principles of the present invention, a continuous reheat generating duct for an MHD system comprises an elongated duct member with which there are associated suitable magnetic flux producing means and through which a conductive working fluid is suitably transported. Means are provided for injecting fuel or oxidant into the duct fluid so as to produce a non-homogeneous mixture of fuel and oxidant in the fluid along the duct length. One or more combustion zones are thus established in the interfacial region or regions between the fuel and oxidant and such zones extend substantially continuously between current collecting duct electrodes in the duct lateral direction so that one or more relatively highly conductive paths are established between the electrodes.

Accordingly, it is an object of the invention to provide a novel MHD generating duct arrangement wherein power is generated with improved efficiency and increased power density through continuous reheat of a working fluid having non-homogeneously mixed fuel and oxidant components.

Another object of the invention is to provide a novel MHD generating duct arrangement wherein continuous combustion is provided in a working fluid having non-homogeneously mixed fuel and oxidant components so that working fluid temperature and conductivity are maintained at a relatively high level along the duct length.

It is a further object of the invention to provide a novel MHD generating duct arrangement wherein power is generated with improved efficiency and increased power density as a result of the establishment of one or more highly conductive combustion zones therein.

An additional object of the invention is to provide a novel MHD generating duct arrangement wherein power is generated with improved efficiency and increased power density as a result of the establishment of one or more highly conductive combustion zones which extend between electrodes of the duct.

Another object of the invention is to provide a novel MHD generating duct arrangement wherein a working fluid having non-homogeneously mixed fuel and oxidant components generates power with improved efficiency and increased power density as a result of an average working fluid temperature which is higher than would be possible if the fluid were homogeneously mixed.

These and other objects of the invention will become more apparent upon consideration of the following detailed description along with the attached drawing, in which:

FIGURE 1 shows a perspective view of an MHD generating duct arrangement constructed in accordance with the principles of the invention and having portions thereof removed;

FIG. 2 schematically shows a temperature profile through a cross-section of the duct arrangement of FIG. 1; and FIG. 3 shows a portion of a longitudinal section of the generating duct arrangement of FIG. 1.

More specifically there is shown in FIGURES 1 and 3 an MHD generating duct arrangement 10 for which suitable magnetic flux producing means are provided. For example, such flux producing means may be of any suitable type and may comprise an elongated magnet disposed about the duct 10 and having magnetizing windings 11 extending therealong, as shown in copending application Ser. No. 317,671, filed by W. Brenner et al. on Oct. 21, 1963, now Patent No. 3,280,349 issued Oct. 18, 1966 and assigned to the present assignee.

Although MHD generating ducts can have an annular or other shape as shown, for example in copending application Ser. No. 318,260, filed by W. Brenner on Oct. 23, 1963, and assigned to the present assignee, the duct 10 is shown herein as being generally rectangular in cross-section and comprises outer structural or metallic walls (not shown) which can be suitably cooled. Immediately within the outer duct walls there are preferably but not necessarily provided insulative lining walls or a liner 12 which is formed from a ceramic or high temperature and electrically insulative material such as zirconia.

Electrode means 14 (formed from zirconium boride for example) are suitably supported on opposed outer walls of the duct 10 so as to face each other across fluid flow channel 16 which extends in the reference X direction. The interelectrode direction is thus disposed in the reference Y direction at right angles to the direction of fluid flow. Further, magnetic flux, as indicated by the reference character 18, is produced by the magnetizing windings 11 in the reference Z direction at right angles both to the direction of fluid flow and the interelectrode direction.

The electrode means 14 can be continuous along the duct length or, as shown here, can comprise spaced electrode elements 20 or 22 distributed along the duct length and preferably having a dimension in the X direction which is relatively short as compared to the interelectrode dimension. Suitable connections can be made from the electrode means 14 to external circuit terminals when current is generated during operation of the generating duct 10.

The working fluid or ionized gas comprises a primary fluid mixture including combustion products and an excess combustion agent suitably transported from a combustion chamber 13 to an inlet end portion 24 of the duct 10 with an inlet velocity and temperature suitable for power generation in the duct 10. The primary fluid can also include injected highly ionizable seed atoms or molecules, such as those of cesium or potassium, so as to improve current generating performance in the duct 10. In order to increase the power generating efficiency and the power density in the duct 10, combustion is continued along the duct length and for this purpose an additive combustion agent or component is injected into the flow stream by injection means 26. Such additive agent is a fuel such as acetylene or pulverized coal carried by air or combustion products if the inlet working fluid has excess oxygen as a combustion agent along with the primary combustion products, or it is an oxidant such as hot air if the inlet working fluid has excess fuel as a combustion agent.

In this example of the invention, the injection means 26 comprise a plurality of struts 28 extending in the interelectrode direction and disposed adjacent the duct inlet end 24. The struts 28 are spaced from each other in the Z direction or laterally of the interelectrode direction and are each provided with a relatively small dimension in such direction so as to provide relatively minimal obstruction to fluid flow in the duct channel 16.

Further, each of the struts 28 encloses a chamber 30 from which fuel or oxidant is injected into the primary flow stream through a discharge port or slit 32 preferably extending along the length of each strut 28 in the interelectrode direction. Suitable means such as a fuel line 34 are provided for transporting fuel or oxidant to the strut chambers 30.

If it is assumed that the primary fluid stream includes in its mixture excess air or oxidant, fuel is fed into the strut chambers 30 and discharged into the duct channel 16 to form respective fuel regions or layers 36 which extend downstream in the longitudinal direction of the duct channel 16 to an extent determined by the initial discharge velocity of the fuel through the strut slits 32, the injected fuel volume, and other factors. As the fuel flows downstream in the regions 36, combustion takes place in interfacial regions 38 between the fuel regions 36 and primary stream regions 40. The fuel regions 36 diminish in size as indicated by the reference character 42 (FIG. 3) in the downstream direction since the fuel therein becomes exhausted by combustion during the downstream flow. If the incoming primary fluid stream is rich in fuel instead of oxidant, then an oxidant such as air is fed into the strut chambers 30 and combustion occurs along the downstream or X direction in the duct channel 16 in a manner similar to that described where the injected combustion agent is fuel.

Preferably, each region 36 extends substantially continuously between the electrodes 20 and 22 so that full power generating advantage can be gained from the high or enhanced electrical conductivity existing in the interfacial regions or combustion zones 38. In addition, the combustion zones 38 are preferably spaced from duct side wall lining 44.

This enables the average operating temperature of the non-homogeneous fluid mixture in the duct channel 16 to be maintained at a level above the upper operating temperature limit of the ceramic or other material of the side wall lining 44. Such upper temperature limit for the side wall material exists where side wall leakage current becomes excessive or where structural integrity of the material is subject to heat damage.

Thus, as shown in FIG. 2 by a temperature profile across the duct channel 16 in the Z direction, average temperature 46 can be somewhat above side wall temperature 48. Since fluid electrical conductivity increases substantially exponentially with increasing temperature, it is clear that even a slight increase in average fluid temperature (say from 4500° F. to 4600° F.) has significant effect on power generation. Such advantage in power generation is in addition to that derived from the enhanced electrical conductivity existing in the combustion zones 38.

The struts 28 can be formed from a metallic plate cooled by water or other means and coated with ceramic material such as zirconia. Thus, a modified strut structure can be made similar to that shown in copending application entitled, "Continuous Reheat MHD Generating Duct Arrangement" filed by Stewart Way on Nov. 27, 1963, Ser. No. 326,612 and assigned to the present assignee.

On the other hand, the injection means 26 can comprise a plurality of jet nozzles (not shown) arranged in spaced relation on either the upper or lower surface of the duct channel 16. Such nozzles are spaced laterally of the duct channel 16 in a manner similar to the spacing among the struts 28, and in addition such nozzles can be so arranged in each of a plurality of rows spaced along the length of the duct channel 16. This injection means is particularly adaptable to the utilization of liquid fuel because such fuel can be injected into the duct channel 16 in the interelectrode direction as a jet to an extent determined by the initial injection velocity and jet size. The downstream nozzles can inject the fuel to successively lesser extents so that the cross-section through the duct channel 16 adjacent the nozzle row furthest downstream would contain a non-homogeneous fluid geometry similar to that shown in FIGURE 1.

In operation, the generator parameters can be controlled such that the rate at which heat is released by combustion within the duct channel 16 is substantially equal to the rate at which heat is absorbed or utilized in the generation of electric energy. In this manner, the fluid flow through the duct channel 16 can be substantially isothermal since the outlet fluid temperature can be maintained substantially equal to the inlet fluid temperature. Generated power density can thus be maintained generally uniform throughout the length of the generating duct 10 thereby providing improved generating efficiency and increased power density. For example, without continuous reheat provided by combustion within the duct 10, a fluid temperature drop of 200° F. over a duct length would not be unusual during operation, and in such case power density can drop by a factor of three over the duct length. Thus, without the reheating effect of combustion within the duct 10, generating performance or efficiency decreases in the downstream direction, whereas, with duct combustion, generating performance or efficiency is substantially maintained throughout the duct length.

In summary, the improved power generating performance provided by the present invention includes the power gains provided by temperature maintenance along the duct length, the power gains provided by a relatively increased average fluid temperature, and the power gains provided by the enhanced conductivity of the combustion zones 38. In connection with the improvement achieved through the higher electrical conductivity combustion zones, a simple calculation can be made to predict the effective improved duct fluid electrical conductivity. Thus, combustion products, unburned fuel, and combustion flame comprise the non-homogeneous duct fluid. The contribution of conductivity from each of the regions can be added to determine the effective conductivity for comparison with the conductivity which would exist in the duct channel 16 if it were completely filled only with combustion products. Theoretical calculations show that in the temperature region between 2500° K. and 3000° K., a temperature increase of 500° C. will increase electrical conductivity of seeded combustion products by a factor of approximately seven. If it is assumed that the gas temperature within the combustion zone is approximately 500° C. above that of the combustion products region, and that the unburned fuel makes no contribution to the conductivity, the duct employing the non-homogeneous mixture can have an effective conductivity at least two and one half times that of a duct filled completely with combustion products.

The foregoing description has been presented only to illustrate the principles of the invention. Accordingly, it is desired that the invention be not limited by the embodiments described, but, rather, that it be accorded an interpretation consistent with the scope and spirit of its broad principles.

What is claimed is:

1. A continuous reheat magnetohydrodynamic generating duct arrangement comprising an elongated duct member having an elongated channel extending between electrode means disposed on laterally spaced walls thereof, said channel providing a flow path through which primary conductive fluid is transported from a combustion chamber and across which a magnetic field is established transversely of the interelectrode direction by suitable flux producing means, said primary conductive fluid having an excess of a combustion agent, and means for injecting another combustion agent nonhomogeneously into said primary fluid for combustion with the first mentioned combustion agent in at least one combustion zone which extends longitudinally along at least a substantial portion of said channel and substantially entirely across said channel in the interelectrode direction and generally in planes parallel to the direction of the electric field between the electrodes.

2. A continuous reheat magnetohydrodynamic generating duct arrangement as set forth in claim 1, wherein said combustion zone extends along substantially the entire length of said duct so that the flow of said primary fluid and injected combustion agent can be accomplished substantially isothermally for generally uniform power generating density within said channel.

3. A continuous reheat magnetohydrodynamic generating duct arrangement comprising an elongated duct member having an elongated channel extending between electrode means disposed on laterally spaced walls thereof, said channel providing a flow path through which primary conductive fluid is transported from a combustion chamber and across which a magnetic field is established transversely of the interelectrode direction by suitable flux producing means, said primary conductive fluid having an excess of an oxidant, and means for injecting a fuel non-homogeneously into said primary fluid for combustion with said oxidant in a plurality of laterally spaced combustion zones which respectively extend longitudinally along at least a substantial portion of said channel and substantially entirely across said channel in the interelectrode direction and generally in planes parallel to the direction of the electric field between the electrodes.

4. A continuous reheat magnetohydrodynamic generating duct arrangement comprising an elongated duct member having an elongated channel extending between electrode means disposed on laterally spaced walls thereof, said channel providing a flow path through which primary conductive fluid is transported from a combustion chamber and across which a magnetic field is established transversely of the interelectrode direction by suitable flux producing means, said primary conductive fluid having an excess of a fuel, and means for injecting an oxidant non-homogeneously into said primary fluid for combustion with said fuel in a plurality of laterally spaced combustion zones which respectively extend longitudinally along at least a substantial portion of said channel and substantially entirely across said channel in the interelectrode direction and generally in planes parallel to the direction of the electric field between the electrodes.

5. A continuous reheat magnetohydrodynamic generating duct arrangement as set forth in claim 1, wherein said duct member includes spaced elongated insulative side walls extending between said electrode bearing walls and wherein said combustion zone is spaced from and substantially parallel to said side walls so that the fluid in said channel can be efficiently operated to produce power at a higher average temperature and higher power density than would be the case in the absence of combustion within said channel.

6. A continuous reheat magnetohydrodynamic generating duct arrangement comprising an elongated duct member having an elongated channel extending between electrode means disposed on laterally spaced walls thereof and having insulating side walls extending between said first-mentioned walls, said channel providing a flow path through which primary conductive fluid is transported from a combustion chamber and across which a magnetic field is established transversely of the interelectrode direction by suitable flux producing means, said primary conductive fluid having an excess of a combustion agent, and means for injecting another combustion agent non-homogeneously into said primary fluid for combustion with the first mentioned combustion agent in at least one combustion zone which extends longitudinally along at least a substantial portion of said channel and substantially entirely across said channel in the interelectrode direction and in planes substantially parallel to said side walls, said injecting means including at least one heat resistant strut extending in the interelectrode direction in a region adjacent the inlet end of said channel, said strut having a port to which said other combustion agent is transported and from which said other agent is injected into said channel to produce the described combustion.

7. A continuous reheat magnetohydrodynamic generating duct arrangement comprising an elongated duct member having an elongated channel extending between electrode means disposed on laterally spaced walls thereof and having insulating side walls extending between said first-mentioned walls, said channel providing a flow path through which primary conductive fluid is transported from a combusiton chamber and across which a magnetic field is established transversely of the interelectrode direction by suitable flux producing means, said primary conductive fluid having an excess of a combustion agent, and means for injecting another combustion agent non-homogeneously into said primary fluid for combustion with the first mentioned combustion agent in at least one combustion zone which extends longitudinally along at least a substantial portion of said channel and substantially entirely across said channel in the interelectrode direction and in planes substantially parallel to said side walls, said injecting means including a plurality of heat resistant struts extending in the interelectrode direction and spaced laterally across a region adjacent the inlet end of said channel, each of said struts having a port to which said other combustion agent is transported and from which said other agent is injected into said channel to produce the described combustion.

8. A continuous reheat magnetohydrodynamic generating duct arrangement as set forth in claim 7, wherein said duct member includes spaced elongated insulative side walls extending between said electrode bearing walls and wherein said combustion zones are spaced from said side walls so that the fluid in said channel can be efficiently operated for power generation at a higher average temperature than would be the case in the absence of combustion within said channel.

9. A continuous reheat magnetohydrodynamic generating duct arrangement as set forth in claim 7, wherein said combustion zones extend along substantially the entire length of said duct so that the flow of said primary fluid and injected agent can be accomplished substantially isothermally for generally uniform power generating density within said channel.

10. A continuous reheat magnetohydrodynamic generating duct arrangement comprising an elongated duct member having an elongated channel extending between electrode means disposed on laterally spaced walls thereof, said channel providing a flow path through which primary conductive fluid is transported from a combustion chamber and across which a magnetic field is established transversely of the interelectrode direction by suitable flux producing means, said primary conductive fluid having an excess of a fuel, and means for injecting an oxidant non-homogeneously into said primary fluid for combustion with said fuel in a plurality of laterally spaced combustion zones which respectively extend along at least a substantial portion of said channel and substantially across said channel in the interelectrode direction, said injecting means including a plurality of heat resistant struts extending in the interelectrode direction and spaced laterally across a region adjacent the inlet end of said channel, each of said struts having a port to which said oxidant is transported and from which said oxidant is injected into said channel to produce the described combustion.

11. A continuous reheat magnetohydrodynamic generating duct arrangement comprising an elongated duct member having an elongated channel extending between electrode means disposed on laterally spaced walls thereof, said channel providing a flow path through which primary conductive fluid is transported from a combustion chamber and across which a magnetic field is established transversely of the interelectrode direction by suitable flux producing means, said primary conductive fluid having an excess of an oxidant, and means for injecting a fuel non-homogeneously into said primary fluid for combustion with said oxidant in a plurality of laterally spaced combustion zones which respectively extend longitudinally along at least a substantial portion of said channel and substantially entirely across said channel in the interelectrode direction in planes substantially parallel to said side walls, said injecting means including a plurality of heat resistant struts extending in the interelectrode direction and spaced laterally across a region adjacent the inlet end of said channel, each of said struts having a port to which said fuel is transported and from which said fuel is injected into said channel to produce the described combustion.

References Cited
UNITED STATES PATENTS 3,303,363   2/1967   Louis _____ 310—11

MILTON O. HIRSHFIELD, *Primary Examiner.*

D. X. SLINEY, *Assistant Examiner.*